United States Patent [19]

Takamura et al.

[11] Patent Number: 4,950,521

[45] Date of Patent: Aug. 21, 1990

[54] COVERING MEMBER FOR CASING OF FIXED DISC MEMORY UNIT

[75] Inventors: Tooru Takamura; Noboru Shimamoto, both of Gunma, Japan

[73] Assignee: Shin-Etsu Chemical Co., Ltd., Tokyo, Japan

[21] Appl. No.: 938,813

[22] Filed: Dec. 8, 1986

[30] Foreign Application Priority Data

Dec. 11, 1985 [JP] Japan .................................. 60-190477

[51] Int. Cl.$^5$ ................................................ B32B 3/14
[52] U.S. Cl. ...................................... 428/78; 277/227; 277/235 A; 277/235 R; 428/192; 428/447; 428/450
[58] Field of Search .................... 428/447, 66, 195, 78, 428/192, 450; 277/235 R, 235 A, 227

[56] References Cited

U.S. PATENT DOCUMENTS 4,332,844  6/1982  Hamada et al. ...................... 428/447

*Primary Examiner*—Pamela R. Schwartz
*Attorney, Agent, or Firm*—McAulay Fisher Nissen & Goldberg

[57] ABSTRACT

Different from a conventional casing for fixed disc memory assembly constructed by conjoining two covering members at the flanges by sandwiching a gasket prepared by punching a sheet of a spongy rubber, the invention proposes a covering member in which a gasket of a solid silicone rubber is adhesively and integrally bonded to the flange thereof in advance so that the fixed disc memory assembly can be constructed with greatly improved work-ability in addition to the advantage obtained by the absence of any tiny rubber particles formed by pubching of a spongy rubber sheet as the dusts to cause serious troubles. The gasket may be shaped either by a conventional rubber molding method and bonded to the flange using a silicone-based adhesive or may be formed by the techniques of the so-called FIPG method.

2 Claims, 2 Drawing Sheets

FIG. I
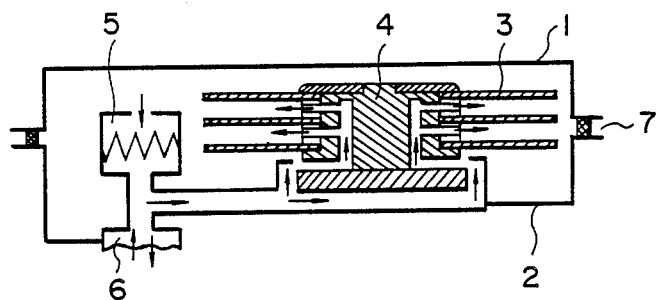
PRIOR ART
FIG. 2a
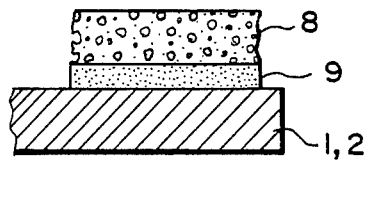
FIG. 2b
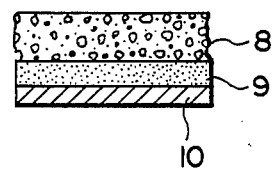

COVERING MEMBER FOR CASING OF FIXED DISC MEMORY UNIT

BACKGROUND OF THE INVENTION

The present invention relates to a covering member for a casing of fixed disc memory unit used in computers and other electronic data processing instruments as an external storage medium. More particularly, the invention relates to a covering member for a casing of fixed disc memory unit provided with an air-tight gasket integrally bonded together in advance.

As is well known, many of conventional computers and other data-processing electronic instruments utilize a floppy disc as an external data storage medium. It is a trend in recent years that the floppy discs are increasingly being replaced with fixed disc memory units by virtue of the much larger storage capacity thereof than floppy discs and the much shorter access time for reading-out of the stored information. The above mentioned fixed disc memory is a thin rigid disc usually made of an aluminum alloy and coated with a layer of a magnetic material for magnetic recording. The fixed disc is rotated by means of a spindle motor and a magnetic head held to face the rotating disc keeping a very narrow clearance therebetween of only about 0.5 $\mu$m serves to write-in and read-out the magnetically recorded information into and out of the disc.

As is readily understood from the above described working principle of a fixed disc memory, very serious troubles are sometimes caused by dusts entering the clearance between the rotating disc and the magnetic head. Accordingly, it is usual that such a fixed disc is encased together with the spindle motor in an air-tightly sealable casing formed of two covering members of a top cover and a down cover conjoined into the casing by screwing with a gasket member around the peripheral flange of covering member at which it is conjoined with the other covering member. The air inside the casing should be always kept clean or dust-free by means of a filter for internal air circulation and a filter for ventilation with the outer atmosphere.

The above mentioned gasket member used between the top and down covering members is usually prepared to fit the peripheral flange of the covering member by punching a sheet of a foamed or spongy rubber such as silicone rubbers, urethane rubbers, polychloroprene rubbers, NBR rubbers and the like and coated on the surface with a tacky adhesive to facilitate mounting and fixing on the flange of the covering member, optionally, with a release paper applied thereto for providing temporary protection.

The above mentioned procedure of preparation and use of the gasket members of a spongy rubber is very troublesome and economically disadvantageous because a large proportion of the spongy rubber sheet is necessarily wasted after punching of the gasket and gasket members of very accurate dimensions can hardly be obtained by punching a spongy rubber sheet. Moreover, coating of the gasket member with a tacky adhesive and mounting of the gasket member on the correct position of the covering member require great skillfulness of the workers to greatly decrease the productivity. What is worse is that punching of a spongy rubber sheet unavoidably produces a considerable amount of tiny rubber particles which are retained in the open pores of the spongy rubber of the gasket member to be eventually released inside the casing and cause troubles as a kind of dusts. Accordingly, it has been eagerly desired to develop a covering member of casing for a fixed disc memory without the above described problems and disadvantages in the prior art.

SUMMARY OF THE INVENTION

Thus, the present invention provides a novel and improved covering member of a casing for fixed disc memory with gasket. The covering member with gasket of the invention for fixed disc memory unit comprises a metal-made disk-like body having a flange around all-over the periphery and a gasket member made of a solid rubber in the form to fit the flange of the dish-like member and adhesively and integrally bonded thereto.

The gasket member is preferably made of a silicone rubber in view of the stability and durability of a silicone rubber-made article in comparison with other rubbers. The pre-shaped gasket member of a silicone rubber is adhesively bonded to the flange of the disk-like body of the casing by use of a silicone-based adhesive. Alternatively, the gasket member of a silicone rubber may be formed by the technique of so-called FIPG (formed-in-place gasket) method using a room temperature- or low temperature-curable flowable silicone rubber composition so as to save the step of the adhesive bonding work using a silicone-based adhesive.

BRIEF DESCRIPTION OF THE DRAWING

FIG. 1 illustrates an axial cross section of a fixed disc memory assembly with a disc encased in a casing.

FIGS. 2a and 2b are each a cross sectional view of a gasket member of the prior art made of a spongy rubber and adhesively bonded to the flange of a covering member with a layer of an adhesive therebetween and the gasket member before adhesive bonding as temporarily protected with a release paper, respectively.

DETAILED DESCRIPTION OF THE PREFERRED EMBODIMENTS

Figure 3A:
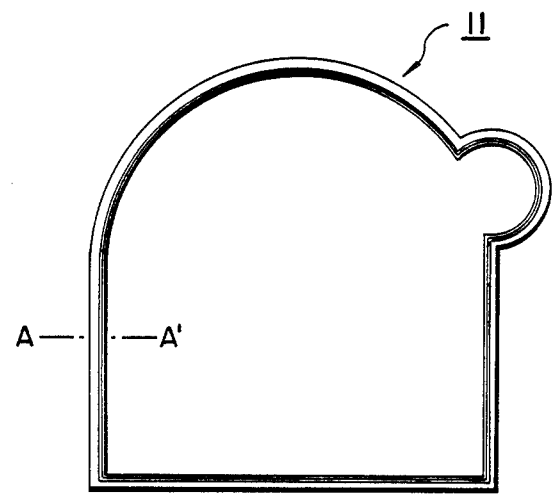
FIGS. 3a, 3b and 3c are each a plan view, cross sectional view and cross sectional view as adhesively bonded to the flange of a covering member, respectively, of an exemplary gasket member used in the invention.

FIG. 1 in the accompanying drawing is given to help general understanding of a fixed disc memory assembly which has a top covering 1 and a down covering 2 conjoined together to form a casing containing a disc 3 therein. The disc 3 is rotated by means of a spindle motor also contained within the casing. The air inside the casing is always kept clean or dust-free by means of a filter 5 for internal air circulation and a filter 6 for ventilation with the outer atmosphere. The top covering 1 and the down covering 2 are air-tightly conjoined together by firmly fastening with screws sandwiching a gasket 7 between the flanges of the coverings 1 and 2.

The above mentioned gasket member 8 in the casing of the prior art is made of a spongy rubber adhesively bonded to the flange of the covering member with an adhesive 9 and protected with a release paper 10 prior to adhesive bonding as is illustrated in FIGS. 2a and 2b, respectively, by a cross section. The cross section of the gasket member 8 in the prior art is necessarily rectangular as a consequence of punching of a sheet of the spongy rubber. As is illustrated in these figures, the side surfaces of the gasket member 8 formed by punching necessarily have a rugged porous appearance as a texture of the spongy rubber.

As is understood from the above given summary of the invention, the characteristic feature of the inventive covering member is that a pre-shaped gasket member of a solid rubber is integrally and adhesively bonded to the flange of a dish-like body forming a half part of the casing of the fixed disc memory assembly.

The rubbery material forming the gasket member is not particularly limitative provided that good air-tight sealing effect can be obtained thereby when the covering member with the gasket is conjoined together with the other covering member as a half part of the casing. The rubbery material should have good rubbery elasticity and be capable of being shaped, for example, by injection molding or compression molding. In this regard, natural rubber and various kinds of synthetic rubbers can be used for the purpose. Among various kinds of rubbery materials, however, particularly preferable is a silicone rubber in view of the good weatherability and absence of the disadvantageous phenomena of blooming and bleeding of additives which cause serious contamination of the casing since silicone rubbers are usually shaped without using process oils and other additives used in conventional synthetic rubbers.

Figure 3B:
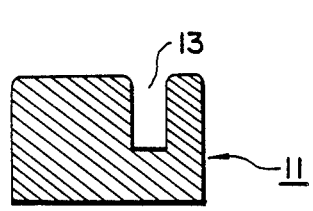
Figure 3C:
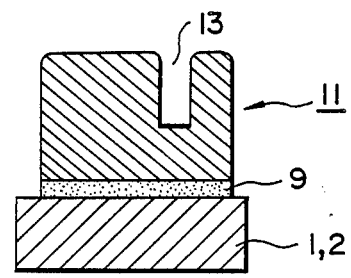

The gasket member of a silicon rubber can be shaped by any of conventional molding methods including compression molding, injection molding, transfer molding, liquid-injection molding and the like. The gasket member should have a configuration to exactly fit the flange of the covering member, for example, as is illustrated in FIG. 3a. The cross sectional form of the gasket member is not particularly limitative including a rectangular cross section, semicircular cross section illustrated in FIG. 4 and so on. It is sometimes advantageous that, as is illustrated in FIG. 3b by the cross section taken along the line A—A in FIG. 3a, the gasket member 11 has a groove 13 over the whole length around from the standpoint of obtaining good air-tight sealability. The thus shaped gasket member 11 is then adhesively and integrally bonded to the flange of the top or down covering member 1 or 2 by use of an adhesive 9. When the gasket member 11 is made of a silicone rubber, the adhesive also should preferably be a silicone-based one in respect of the compatibility therebetween.

Figure 4:
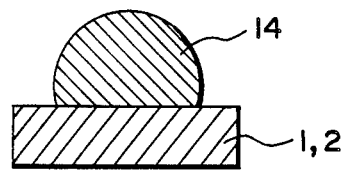
FIG. 4 is a cross sectional view of a gasket member formed on the flange of a covering member by the FIPG method.

Alternatively, the gasket member molded of a silicone rubber and subsequently bonded to the flange of the casing can be replaced by a gasket member formed by the techniques of the so-called FIPG (formed-in-place gasket) method using a room temperature- or low temperature-curable silicone rubber composition. In this case, the cross section of the gasket member 14 can be semi-circular as is illustrated in FIG. 4.

As is described above, the covering member of the invention with gasket for a fixed disc memory assembly is advantageous because the casing can be readily constructed by merely putting together the covering member with gasket and another covering member without gasket at the flanges thereof and firmly fastening them together with screws to obtain air-tight sealing because the gasket member is already adhesively bonded to the flange of one of the covering members. Accordingly, the casing of the fixed disc memory can be built at a greatly decreased cost in comparison with the conventional ones in respect of not only the greatly improved workability in the assemblage of the covering members but also the remarkably decreased cost for the preparation of the gasket members due to the absence of loss unavoidable when the gasket member is prepared by punching of a spongy rubber sheet. Moreover, the gasket member in the invention is shaped not of a spongy rubber but of a solid rubber so that the casing of the fixed disc memory assembled with the inventive covering member is quite satisfactory in respect of the airtight sealability to prevent air leak and the cleanness to be freed from the problem of dusts.

In the following, examples are given to illustrate the inventive covering member with gasket for a fixed disc memory assembly in more detail.

EXAMPLES 1 AND 2

Two silicone rubber gaskets were shaped by injection molding of a silicone rubber composition in a metal mold having a frame-like cavity of 200 mm by 150 mm wide with a rectangular cross section of 2.3 mm by 4 mm mounted on a liquid injection molding machine under an injection pressure of 60 kg/cm$^2$ with an injection time of 5 seconds and curing time of 90 seconds with the metal mold kept at 175° C. in one shot. The thus molded gaskets were washed with water and then ultrasonically cleaned in ethyl alcohol followed by air-drying.

An aluminum-made dish-like covering member having dimensions of 200 mm by 150 mm width and 10 mm depth and provided with a flange of 6 mm width around the periphery and provided with eight holes of 3 mm diameter for screwing was coated on the flange with a silicone-based adhesive by screen printing using a 200 mesh screen and then the silicone rubber-made gasket was mounted on the flange coated with the adhesive using a vacuum packaging machine by transferring under atmospheric pressure from the vacuum chamber of the machine. The gasket was adhesively bonded by heating at 120° C. for 20 minutes to effect curing of the silicone-based adhesive.

In Example 1, one of the thus prepared covering members with gasket was washed first with ethyl alcohol and then four times with pure water having an electroconductivity of 10 $\mu$mho or lower after filtration through a membrane filter having pores of 1 $\mu$m diameter followed by spontaneous drying in a clean bench of cleanness 100. The thus obtained covering member with gasket after cleaning was conjoined at the flange with another covering member of the same dimensions having a stop valve for the determination of air leak and cleanness by fastening with eight screws of 3 mm diameter under a torque of 5 kg-cm and subjected to the tests of air leak and cleanness. The air leak test was performed by increasing the pressure inside the casing by an increment of 30 mmH$_2$O and determining the pressure inside the casing after lapse of 1 minute. When the pressure difference with the atmosphere was 20 mmH$_2$O or larger after 1 minute of keeping, the air-tight sealing was considered to have passed the test. The cleanness was determined by counting the number of particles having a particle diameter of 0.3 $\mu$m or smaller using a particle counter. The cleanness, i.e. the number of the thus counted particles, should not exceed 10 to ensure a good dust-free condition. The results in this case were that the value of the air leak test was 24 mmH$_2$O and the cleanness was 2 to be more than satisfactory.

In example 2 undertaken for comparison, the same testing procedure as described above was repeated excepting omission of the procedure of washing and cleaning in the clean bench. The results of the air leak test and cleanness test were 24 mmH$_2$O and 25, respectively.

EXAMPLE 3

A FIPG method was applied to the formation of a silicone rubber-made gasket having a rectangular cross section of 2.0 mm by 4.0 mm on the flange of the same aluminum-made covering member as used in the preceding examples using a silicone rubber composition (KE 3482R, a product by Shin-Etsu Chemical Co.). After standing for 2 hours at room temperature, the covering member provided with gasket adhesively bonded to the flange was washed and cleaned in the same manner as in Example 1 and subjected to the air leak test and cleanness test to give the results of 27 mmH$_2$O and 7, respectively.

What is claimed is:

1. In a covering member for a casing of a fixed disc memory assembly of a computer, said covering member having a flange about its periphery and a sealing gasket secured thereto, the improvement which comprises said sealing gasket being made of a solid silicone rubber and being adhesively bonded to the flange with a silicone-based adhesive.

2. In a covering member for a casing of a fixed disc memory assembly of a computer, said covering member having a flange about its periphery and a sealing gasket secured thereto, the improvement which comprises said sealing gasket being made of a solid silicone rubber and being formed on the flange by the formed-in-place gasket method.

* * * * *